Feb. 18, 1941.  E. S. BARTLETT  2,232,361
SHEARING DEVICE
Filed Nov. 8, 1937

Inventor:
Edwin S. Bartlett
By
McCanna, Wintercorn & Morebach
Attys.

Patented Feb. 18, 1941

2,232,361

UNITED STATES PATENT OFFICE 2,232,361

SHEARING DEVICE

Edwin S. Bartlett, Chicago, Ill., assignor to Chicago Flexible Shaft Company, Chicago, Ill., a corporation of Illinois Application November 8, 1937, Serial No. 173,367

3 Claims. (Cl. 30—208)

This invention relates to shearing machines and more particularly to a novel combination of shearing cutters for use in conventional shearing heads.

The shearing of sheep and similar animals has become a highly perfected art and the workmen engaged in this occupation become very skillful and efficient, so much so that they can detect and object to very minor irregularities or defects in the tools they use. While modern power driven shearing machines are generally quite efficient, yet the comb and cutter are not capable of passing through the wool at the speed which might be anticipated from the rapidity of the cutter movement. Because of the nature of the operation and the fact that the operators crowd the tools to the very limit of their capacity, it is difficult to determine the precise explanation for this limitation in speed. My investigations have shown me that it is due to a number of causes, among which is the inefficiency of the shearing action through a part of the cutter stroke due to design features dictated by requirements other than simple efficiency of cutting, such as ease of handling, lightness, balance, and mechanical simplicity. These design features are well established in the industry and are not subject to material change for the purpose of improving the cutting efficiency, and even though they were subject to change, it is doubtful if a more efficient composite structure could be devised. It is therefore necessary to improve the cutting efficiency while retaining the design features, which are in certain respects repugnant thereto. These difficulties arise through the fact that the teeth of the comb must lie on parallel center lines and the ends of the teeth must rest on an arc curving from the center of the comb backward, while, on the other hand, the cutter prongs must subscribe an arc across the teeth, as a result of which the shearing angles between the cutter prongs and the comb teeth are constantly changing during each stroke, and the angles are different between each cutter prong and the adjacent comb tooth. This means that during the cutting stroke the angles between the inner edge of the cutter prongs and the adjacent comb teeth become greater as the outer edges of the comb are approached, and I have found that this is one of the factors limiting the cutting speed of the shearing machine.

The primary object of the invention is to provide a comb and cutter combination of improved shearing efficiency and speed by establishing a new and different shearing relation between the elements of the comb and cutter.

A further object of the invention is to provide a shearing machine cutter of novel and more efficient characteristics.

Other objects and advantages will become apparent to those skilled in the art from the following description and the accompanying drawing, in which—

Figure 1:
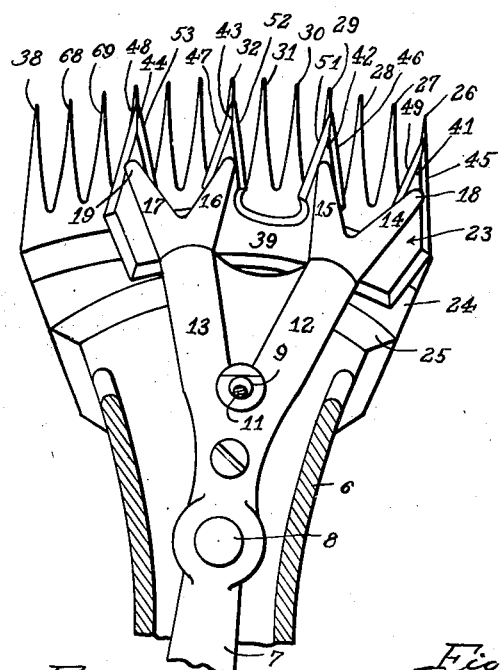
Figure 1 is a fragmentary top view of a shearing hand piece embodying my invention and showing the comb and cutter, the hand piece being shown partly in section.

The invention contemplates a shearing device having a shearing head of conventional form, as, for example, that shown in Figure 1, in which the numeral 6 designates the frame of a common form of sheep shearing head adapted to be held in the hand of the operator and manipulated during the shearing operations. A fork 7 is supported for oscillation on a pin 8 and has a seat 9 against which a pressure applying pin 11 bears for the purpose of applying pressure to the cutter and for regulating the shearing tension between the comb and the cutter. The fork 7 has arms 12 and 13 from which branch fingers 14, 15, 16 and 17. At least the fingers 14 and 17 have pins 18 and 19 receivable in openings 21 and 22 of a cutter designated generally by the numeral 23. The cutter rides on and is carried by a comb designated generally by the numeral 24 releasably attached to the forward end 25 of the frame member 6.

Figure 3:
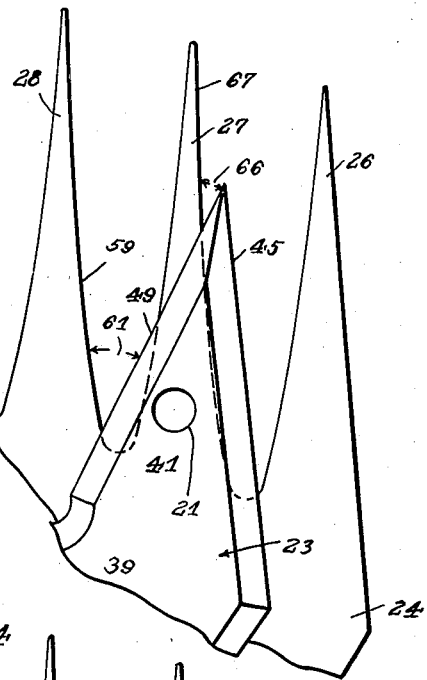
Figs. 3 and 4 are fragmentary enlarged views of a diagrammatic nature showing my improved comb and cutter combination and a conventional comb and cutter combination for the purpose of illustrating the principle of the invention.

The comb 24 is, in this instance, of thirteen tooth design numbered 26 to 38, inclusive. The teeth are arranged symmetrically with respect to parallel lines, as shown in Fig. 3, and the forward ends of the teeth form an arc sloping backward in each direction from the tooth 32, the teeth being of the same length across the entire width of the comb.

The cutter 23 is positioned on the comb as best shown in Figure 1 and has an arcuate body portion 39 and spaced cutting prongs 41, 42, 43 and 44, the holes 21 and 22 being positioned in the prongs 41 and 44. The cutter prongs 41, 42, 43 and 44 have outer shearing edges 45, 46, 47 and 48, respectively, and inner shearing edges 49, 51, 52 and 53, each adapted to cooperate with shearing edges at the sides of the comb teeth. The numerals 54, 55, 56 and 57 designate center lines through the cutter prongs bisecting the angles between the outer and inner cutting edges of the prongs, and the numeral 58 designates the center line of the cutter.

Figure 2:
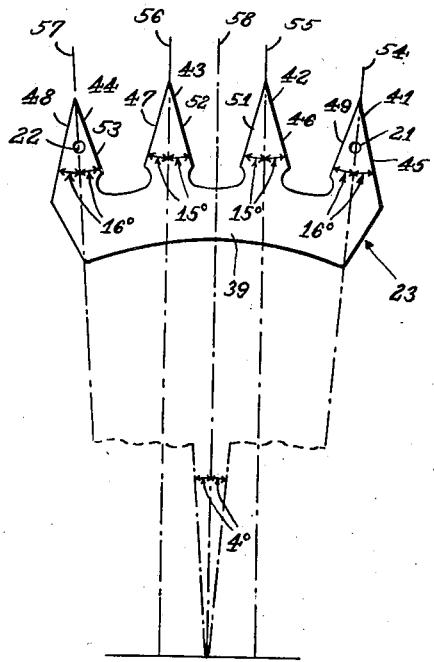
Fig. 2 is a top view of a cutter embodying my invention showing the arrangement of the cutter and prongs.

According to the invention, the center lines 55 and 56 of the cutter prongs 42 and 43 are parallelly disposed as shown in Fig. 2, and parallelly arranged with respect to the center line 58 of the cutter, and the center lines 54 and 57 of the cutter teeth 41 and 44 are disposed at an angle not exceeding about 4° with respect to the center line 58 of the cutter. I have found that while theoretically it might be advantageous to make the center lines 54 and 57 parallel with the center line 58 of the cutter, that for practical reasons connected with the general design of the comb it is advisable to give the center lines 54 and 57 a slight slope not exceeding about 4° as above stated. Through the above-mentioned arrangement of the prongs on the cutter the shearing relationship between the cutter prongs and the comb teeth is materially improved, particularly on the inner cutting edges 49 and 53 of the outer prongs 41 and 44.

This cutting relationship is further improved by reducing the angle of the cutting edges of the prongs with respect to the center line to a point at which the maximum angle is about 16°, though it will be realized that this figure may be exceeded slightly in practice. In the present instance, as shown in Fig. 2, I have arranged the cutter so that the angles of the cutting edges 45 and 49 with respect to the center line 54 is about 16°, and likewise the angles of the cutting edges 48 and 53 with respect to the center line 57 is about the same amount. On the other hand, the angles of the cutting edges on the center prongs 42 and 43 is reduced to about 15° as shown in Fig. 2. The greater angle is arranged on the prongs 41 and 44 for the reason that the distance between the holes 21 and 22 through which the cutter is driven has become fixed or standard through long usage and is required for the cutter to fit in conventional hand pieces now widely distributed in the market.

Figure 4:
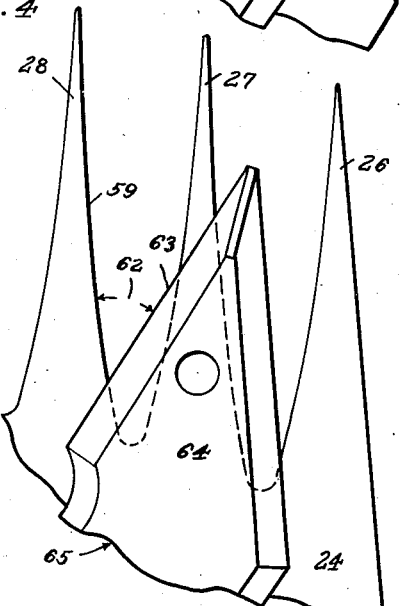

The improvement in the cutting and shearing efficiency of the cutter and comb will be apparent from a comparison of Figs. 3 and 4, and particularly comparison of the shearing angle between the edge 49 of the cutter prong 41 and the cutting edge 59 of the comb tooth 28; that is, a comparison of the angles 61 and 62, the numer 63 designating the inner cutting edge of an end prong 64 of a conventional four-prong cutter indicated at 65. Attention is directed to the fact that it is this angle and the angle 66 between the cutting edge 67 of the tooth 27 and the cutting edge 49 of the prong 41 which occasions the greatest inefficiency in the shearing action. As will be seen from Figure 1, the prongs 42 and 43 operate throughout their travel at a fairly efficient cutting angle with respect to the comb teeth over which they pass. Likewise, the outer cutting edges 45 and 48 of the end prongs operate at fairly satisfactory shearing angles, as will be apparent from Figs. 1 and 3. I have found that the major slowing up of the shearing operation is occasioned by the bad cutting angles between the inner cutting edges 49 and 53 of the cutter and the outer cutting edges 67 and 59 and 68 and 69 of the comb teeth. This is occasioned at the beginning and ending of the cutter movement from its extreme position, and while the cutter is traveling at a relatively low rate of speed, which further tends to aggravate the situation.

It will therefore be seen that I have produced a cutter and comb combination of materially improved efficiency and also an improved cutter by decreasing the shearing angle between the inner edges of the remote cutter prongs and the adjacent cutting edges of the comb teeth, by placing the cutter prongs with their cutting edges symmetrical with respect to parallel lines or lines within about 4° of parallelism and by limiting the angle of the cutting edges of the prongs to a maximum of about 16° with respect to the center lines.

While I have thus described and illustrated a specific embodiment of the invention, this has been done by way of illustration, and I do not wish to be limited except as required by the prior art.

I claim:

1. The combination in a shearing machine of a comb having teeth thereon arranged in parallel relationship, a four-pronged cutter positioned against the comb for reciprocation on an arc with the prongs in shearing relationship with said teeth, the center lines of the two prongs adjacent the center of the cutter being substantially parallel and the center lines of the two prongs remote from the center of the cutter deviating from said parallelism by not more than about 4°, the center lines of said remote prongs diverging outwardly from a center spaced inwardly from the cutter.

2. A shearing cutter for shearing machines of the type having a comb provided with teeth in parallel relationship comprising a body portion adapted to reciprocate on an arc across the comb, and four cutter prongs spaced along one edge of said body portion adapted to cooperate with said teeth in shearing action, said prongs having shearing edges on their opposed sides, the center lines of the two prongs adjacent the center of the cutter being substantially parallel and the center lines of the two prongs remote from the center of the cutter deviating from said parallelism by not more than about 4°, the center lines of said remote prongs diverging outwardly from a center spaced inwardly from the cutter, the said remote prongs being shaped so that said shearing edges of each lie at a maximum angle of about 16° with respect to said diverging center lines.

3. A shearing cutter for shearing machines of the type characterized by slender longitudinally tapered teeth arranged in an arm in uniformly spaced parallel relationship comprising, a body portion adapted to reciprocate across the comb in an arc conforming to that in which the teeth are arranged, the body portion having four cutter prongs adapted to cooperate with said teeth in a shearing action, the prongs having shearing edges on their opposed sides comprising outer shearing edges 45, 46, 47 and 48 and inner shearing edges 49, 51, 52 and 53, the two inner prongs arranged so that their centerlines bisecting the angles between their respective shearing edges are in substantially parallel relationship, the two outer prongs arranged so that the centerlines bisecting the angles between their respective shearing edges are disposed at a rearwardly converging angle not exceeding 4° with respect to the centerline of the cutter, the maximum angle between the shearing edges of each inner prong being about 30° and the corresponding maximum angle for the outer prongs being about 32°, the prongs arranged so that the inner shearing edges 49—51 and 53—52 have a substantially reduced angle shearing relationship with the complementary shearing edges of the comb teeth.

EDWIN S. BARTLETT.